United States Patent [19]
Girard

[11] Patent Number: 5,495,881
[45] Date of Patent: Mar. 5, 1996

[54] SEALING RING BETWEEN THE BEADS OF A TIRE

[75] Inventor: Dominique Girard, Chateaugay, France

[73] Assignee: Compagnie Generale Des Etablissements Michelin- Michelin & Cie, Clermont Ferrand Cedex, France

[21] Appl. No.: 243,287

[22] Filed: May 17, 1994

[30]     Foreign Application Priority Data

May 26, 1993 [FR] France .................................. 93 06608

[51] Int. Cl.⁶ ........................... B60C 19/04; B60C 25/14
[52] U.S. Cl. ..................... 152/514; 152/400; 152/DIG. 8
[58] Field of Search .................................... 152/152, 279, 152/283, 307, 399–401, 514–516, 501, DIG. 8–DIG. 10

[56]           References Cited

U.S. PATENT DOCUMENTS 2,339,542  1/1944  Hale .
2,731,063  1/1956  Powers .
3,857,427  12/1974  Soucek .
4,063,584  12/1977  Takigawa .
4,558,728  12/1985  Forneris .

FOREIGN PATENT DOCUMENTS 221330  9/1924  United Kingdom .

*Primary Examiner*—Adrienne C. Johnstone
*Attorney, Agent, or Firm*—Brumbaugh, Graves, Donohue & Raymond

[57]           ABSTRACT

An annular element (3) placed between the two beads (12) of a tire (P) mounted on a flat-base rim (J). In order to be able to use the tire on said rim without an inner tube, the annular element, in order to assure the tightness of the assembly, has in meridian section a contour and, in particular, two lateral sides (30) such that the clamping s between the ring and the beads, which is zero or even negative at the base of the ring, increases then slightly over a certain radial distance $h_1$ and then more greatly over a distance $h_2$ radially adjacent the first distance.

9 Claims, 3 Drawing Sheets

SEALING RING BETWEEN THE BEADS OF A TIRE

BACKGROUND OF THE INVENTION

The present invention relates to an annular element intended to be placed between the two beads of a tubeless tire, mounted on a flat-base rim, one of the shoulders of which is removable; the tire is intended, in particular, for use on load handling vehicles. It also concerns the assembly of the ring, the tire, and the rim.

Ordinarily tires for load handling vehicles are mounted on flat rims, are tires which are cured by means of vulcanization bladders, known as "honeycombs", such as described, for instance, in U.S. Pat. No. 3,970,416, and are used with an inner tube and an annular protective element of slight thickness placed between said tube and the base of the rim. This annular element generally has axial ends or lips of suitable shape so as not to damage the inner tube.

Tires for handling vehicles in most cases have an internal form ratio H/S of at most 0.8 and frequently close to 0.5, H being the height of the inner cavity of the tire measured between the rim base and the point of the inner wall of the cavity furthest from the axis of rotation of the tire, and S being the maximum axial width of the inner cavity. It follows from this that damage may be inflicted on the inner tubes, particularly due to rapid wear of the tubes, which is incidental to the use of such tires.

Furthermore, these tires are generally mounted on flat rims formed of three elements, namely the rim base, which is integral with a first rim shoulder, the locking ring, and the second ring shoulder. When the rim is intended for use with a tubeless tire, it is possible to mount such a tire on such a rim with a sealing joint being provided between the bead of the tire and the ring on the side of the removable rim shoulder. Nevertheless, the fact that the dimensional characteristics of the rim have rather large tolerances, that these rims are frequently deformed and ill-fitted, and that the difficulties in positioning and maintaining a sealing joint in the correct position are numerous does not make it possible to obtain proper tightness in the mounting of a tubeless tire on a flat rim or a rim of the same type having three elements.

SUMMARY OF THE INVENTION

In order to obtain the tightness of a tubeless tire mounted on a rim of the type described, the invention employs a sealing ring placed on the base of the rim located between the two beads of the tire for mounting said tire on the rim. This ring is characterized by the fact that its meridian section, in free or unmounted state, is defined by a radially inner generatrix of a radius equal to the radius of the portion of the rim on which it will be placed and of an axial width between 0.8 and 1 times the axial distance between the axially inner ends of the bead toes, by a radially outer generatrix of a radius greater than the radius of the inner generatrix by an amount $h_C$ of between 0.05 $R_J$ and 0.40 $R_J$, $R_J$ being the radius at the seat of the wheel, and by two lateral sides of identical profiles such that the transverse clamping of the ring on the inner walls of the beads, which is negative or zero at the level of the inner generatrix then increases slightly over a radial distance $h_1$ equal to at least 0.05$R_J$, and then increases greatly over a radial distance $h_2$ equal to at most 0.4$R_J$, then becoming at most constant over the radial distance $h_3$ equal to at least 0.02$R_J$ and which, added to the heights $h_1$ and $h_2$, represents the height $h_B$ of the lateral sides of the ring, the difference $h_B-h_c$ being at most equal to 0.05 $R_J$.

By transverse clamping of the sealing ring on the axially inner walls of the beads over a generatrix of given radius with respect to the axis of rotation, there is understood the difference, at the level of this generatrix, between the axial width of the unmounted ring and the axial distance between the two beads of the tire mounted on its service rim and inflated to its rated pressure. If the transverse clamping is called s, the axial width of the ring $L_A$ and the axial distance between the beads $L_B$, then $s=L_A-L_B$.

By a slight increase of the clamping over the distance $h_1$ there is understood a uniform continuous and substantially linear increase until reaching, at the height of the generatrix located at the radial distance $h_1$ from the base of the rim, a maximum positive clamping preferably equal to at most 0.3 $L_A$.

A large increase in the clamping over the distance $h_2$ other than zero is a uniform, continuous and substantially linear increase until reaching at the height of the generatrix spaced radially from the rim base by the distance $h_1+h_2$, a maximum linear positive clamping, preferably at least equal to 0.15 $L_A$.

A large increase over the distance other than zero is an abrupt increase up to a clamping value at least equal to 0.15 $L_A$.

By at most constant clamping, there is to be understood a constant clamping or a decreasing clamping, with the radial distance measured with respect to the base of the rim, while remaining positive.

The distance $h_1$ will advantageously be between 0.05$R_J$ and 0.20$R_J$ and, over a radial distance at most equal to 0.5$h_1$, the clamping $L_A-L_B$ will advantageously be negative, the width of the ring being smaller than the axial distance between the two beads, which permits easier mounting of the tire-ring assembly on the service rim. The radial distance $h_2$ will preferably be between 0 and 0.1$R_J$, which results in a large increase in clamping over a distance of slight height and thus permits a better sealing engagement of the lips of the sealing ring.

As to the distance $h_3$, it will preferably be between 0.02$R_J$ and 0.1$R_J$. The sequence of increase thus described permits a better deformation of the lips of the sealing ring due to their shapes, and thus increased effectiveness from the point of view of sealing. The shape of the meridian section of the ring determines, at the optimal place, the force or pressure of the lips of the ring on the beads necessary to assure the tightness, without the necessity of having a circumferential tensile stressing of said ring mounted on the rim.

In order to facilitate mounting of the ring and the tire, the Shore A hardness of the material will preferably not be greater than 65, the Shore A hardness being measured in accordance with ASTM Standard D67549T. The use of such a property is possible due to the shape of the ring claimed in accordance with the invention which, as known, for instance from French application 2 246 409, has the same advantages as the prior art rings and, in particular, the advantage of maintaining the beads of the tire in place when the tire is traveling under very low or even zero pressure.

Another substantial advantage of the ring in accordance with the invention is the simplicity of its manufacture and accordingly its low cost: it requires, in fact, no backing reinforcement for holding it flat against the base of the rim. Due to the extensibility and extension of the lips of the ring, a sufficient clamping appears on the base of the rim for good holding and centering of the ring.

3

DESCRIPTION OF DRAWINGS

The characteristics and advantages of the invention will be better understood from the following description, read with reference to the drawings which illustrate several embodiments in non-limitative manner and in which.

DESCRIPTION OF PREFERRED EMBODIMENTS

Figure 1:
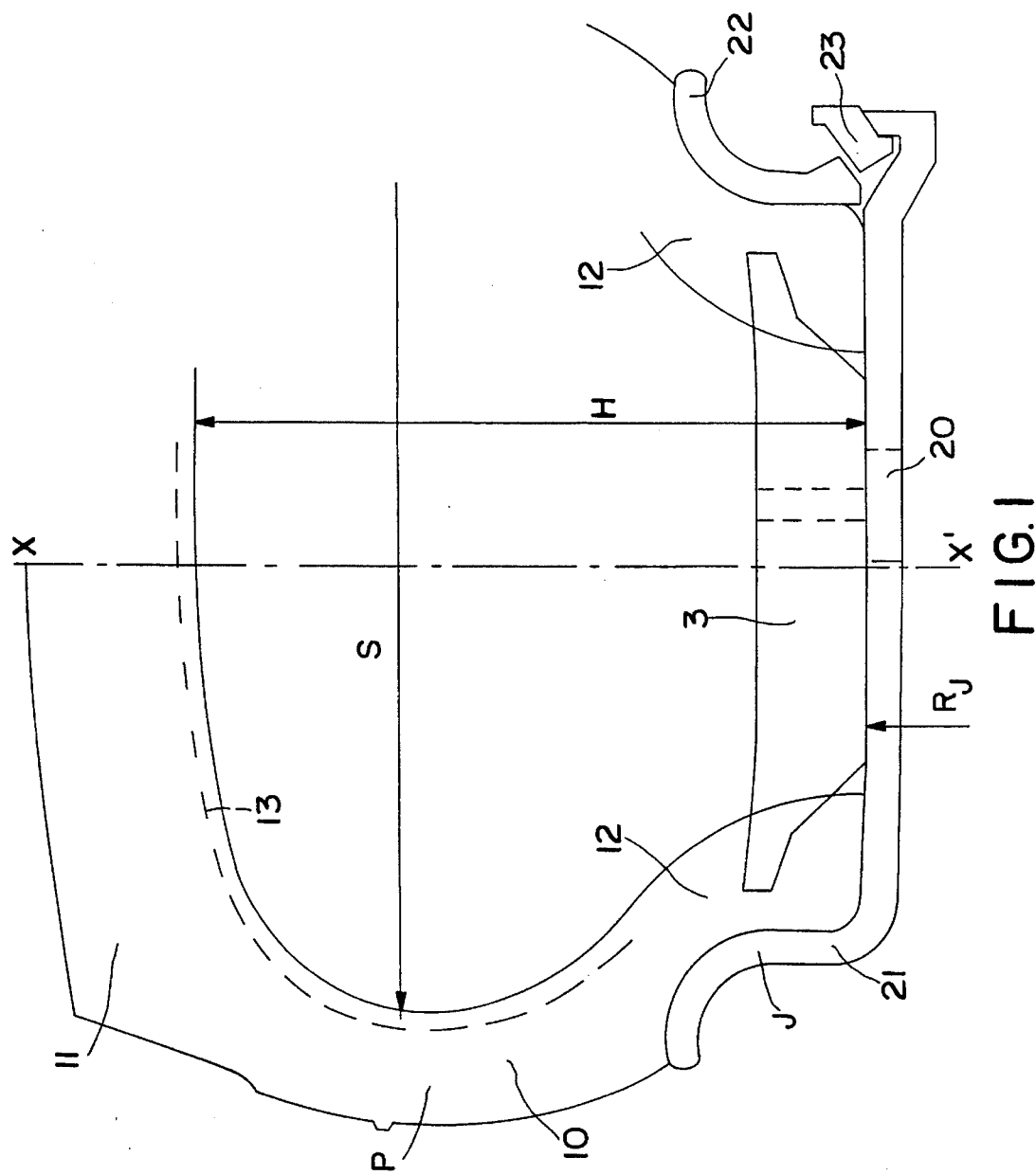
FIG. 1 diagrammatically shows an undeformed ring within a tire of size 180/70 R8 XZA mounted on its 4.33/8 service rim.

The ring 3 in accordance with the invention is used with a tire P, described above, for load handling vehicles. The tire P comprises a tread 11 connected, by two side walls 10, to two beads 12, each of which is reinforced by a bead wire 14 (FIG. 4) around which the carcass armature is anchored forming turn-ups 13'. This tire P, having an inner form ratio H/S of 0.7, is mounted on a rim J, comprising a flat rim base 20 integral with a fixed rim shoulder 21 and attached to a removable rim shoulder 22 by a locking ring 23.

In these rim configurations, the radius $R_j$ at the rim seat is the radius of the rim base. The sealing ring 3 shown in FIG. 1 within the tire P mounted on the rim J and in non-deformed state, is shown in detail in FIG. 2. The meridian section of the ring 3 is defined radially on the inside by a generatrix 31 parallel to the axis of rotation of the mounting rim J, of radius $R_A$ equal to 101.6 mm, and to the nominal radius $R_j$ of the rim base 20, and radially on the outside by a non-linear generatrix 32, such that the radial distance $h_c$ between the said generatrices measured on the axis of symmetry XX' of the meridian section is less than the radial distance $h_B$ between these same generatrices measured over a line parallel to the axis of symmetry XX', passing through the end of the section furthest axially from the said axis of symmetry. In the case studied and shown, $h_c$ is equal to 0.17 $R_J$ and $h_B$ to 0.18 $R_J$. On the side, the meridian section of the ring 3 is defined by two sides 30 symmetrical with respect to the axis XX' and formed, starting from the generatrix 31, by the straight-line segments 33, 34 and 35, respectively.

If one considers a generatrix G parallel to the generatrix 31 and spaced radially from said generatrix 31 by the distance h which is variable between a value of zero and the value $h_B$, this generatrix G has with the two lateral sides 30, points of intersection A which are spaced apart axially by the distance $L_A$ and, with the inner walls of the beads 12 points of intersection B which are spaced apart axially by the distance $L_B$. The distance $L_A$–$L_B$ is the clamping s of the ring on the beads 12.

Figure 2:
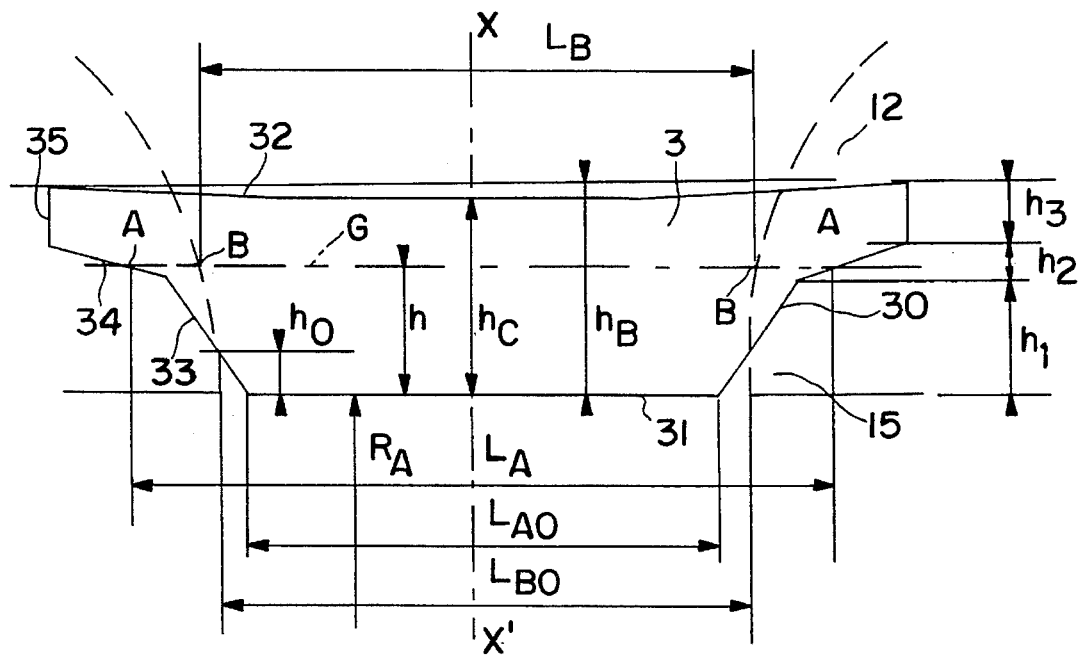
FIG. 2 similarly shows a meridian section of a sealing ring in accordance with the invention.

As shown in FIG. 2, when the distance h is zero, the generatrix G is the generatrix 31 and the clamping s is then negative, the axial distance $L_{AO}$ which is the width of the generatrix 31 being less than the axial distance $L_{BO}$ between the two axially inner ends of the toes 15 of the beads 12. Over the radial distance $h_1$ equal to 0.1 $R_J$ and corresponding to the segments 33, the clamping $L_A$–$L_B$ increases slightly, passing from a negative value to a positive value at the level of the height $h_0$ and equal to 0.05$R_J$ and increasing up to the level of the height $h_1$ equal to 0.13$L_A$. Over the radial distance $h_2$, equal to 0.02$R_J$ and corresponding to the segments 34, the clamping s increases greatly and passes from the value 0.13$L_A$ to a value 0.38$L_A$ for the relatively small radial distance $h_2$. Over the radial distance $h_3$, the clamping s decreases, due to the curvature of the inner wall of the bead 12, while remaining positive and becoming equal to 0.32$L_A$ at the level of the radial distance $h_B$.

Figure 3:
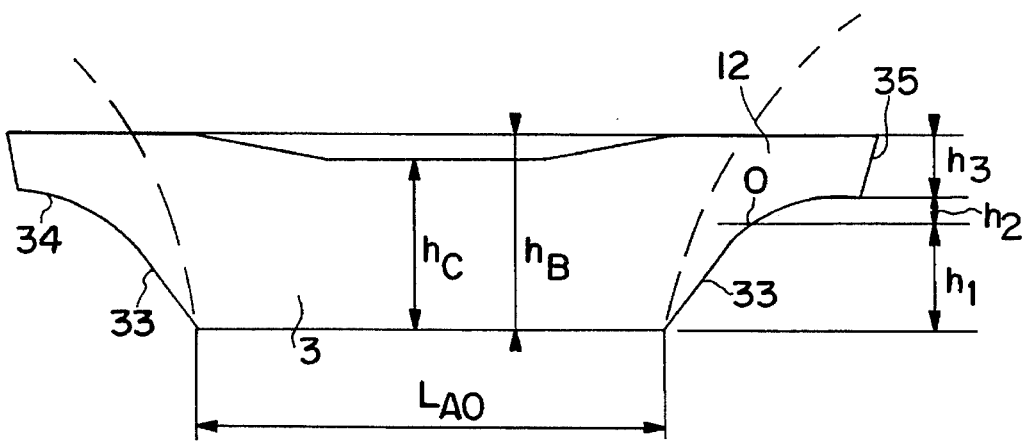
FIG. 3 similarly shows a variant of the sealing ring.

FIG. 3 shows a variant of the sealing ring 3 in which the following differences from the sealing ring of FIG. 2 can be noted. The width $L_{AO}$ of the generatrix 31 is equal to the axial distance $L_{BO}$ between the two axially inner ends of the toes 15 of the beads 12; the clamping is therefore zero. It then becomes positive and increases as in the case FIG. 2, but the segment 33 of said figure is replaced by a first curved arc 33, and the segment 34 is replaced by a second curved arc 34, these two curved arcs having extensions which intersect at O, located at the radial distance $h_1$ from the generatrix 31. The angular point at O can advantageously be replaced by a circular arc of small length and strong curvature, as shown on the side of the ring located to the left in FIG. 3. The curved arc 34 is extended radially to the outside by a straight-line segment 35 which, in this example, is substantially parallel to the inner wall of the bead 12, the length of the distance $h_3$, and the values $h_1$, $h_2$, $h_3$ of FIG. 3 being the same as those of FIG. 2.

Figure 4:
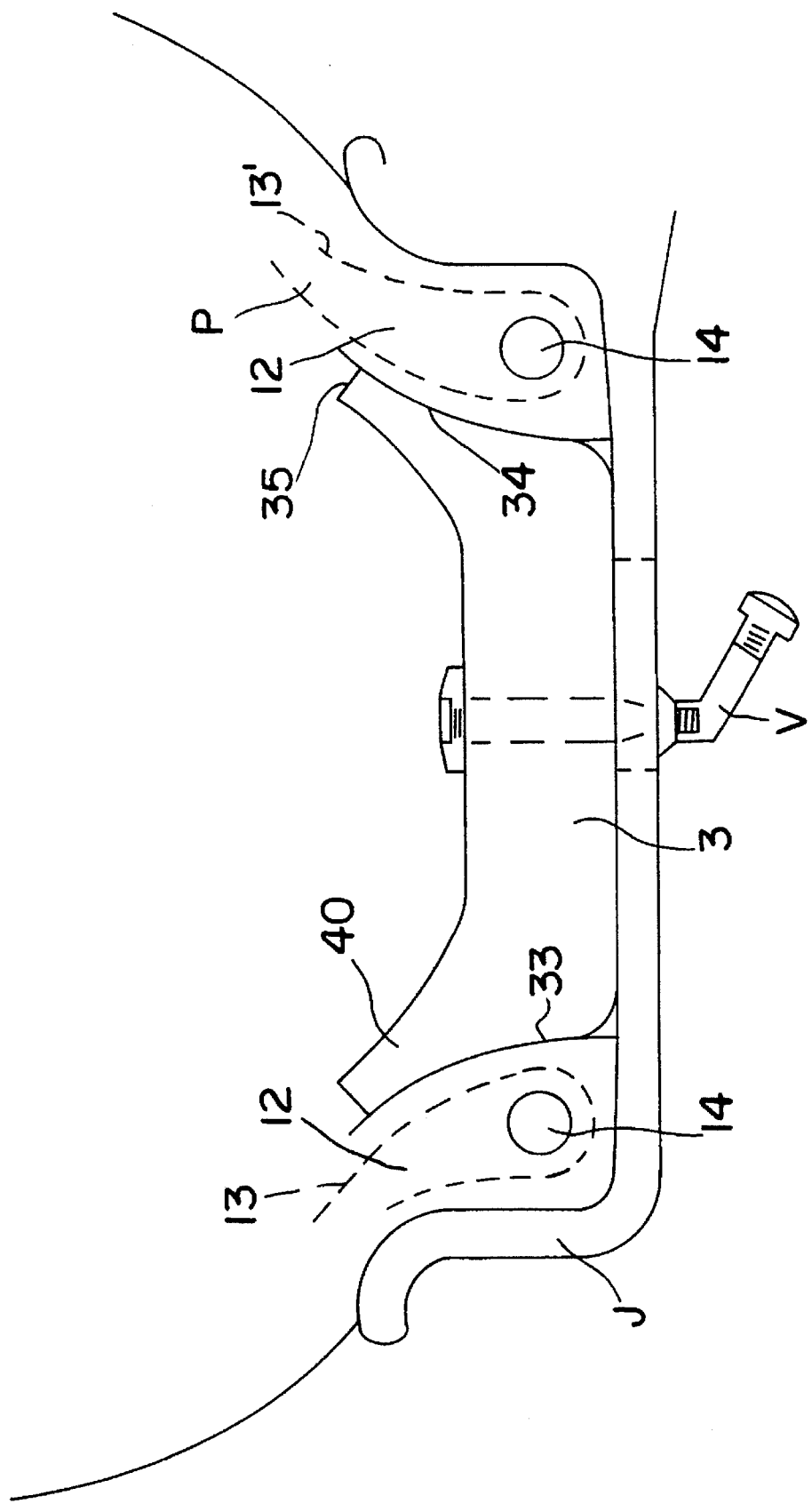
FIG. 4 similarly shows the ring in accordance with the invention, deformed within the tire, mounted and inflated to its rated pressure.

FIG. 4 shows the assembly formed of the tire P, the ring 3, and the rim J as it appears mounted and after inflation by means of the vent valve extension V. The sealing ring 3, lubricated on its inner cylindrical face and on its side walls, is put in place within the tire P. The tire sealing ring assembly is then mounted on the rim J and the tire is inflated. The segments or curved arcs 33, 34 apply themselves against the inner walls of the beads 12 exerting a contact pressure which is definitely greater at the level of the lips 40 of the ring 3 than at the level of the segments or curved arcs 33, the lips 40 being formed by the portions of vulcanized rubber stock forming the ring 3, which are located between the generatrix 32 and the segments 35 and 34 of the lateral sides of the ring.

I claim:

1. A sealing ring for mounting on the flat rim base of a tubeless tire's service rim between the beads of the tire having an inner form ratio H/S at most equal to 0.8, H being the height of the inner cavity of the tire and S being the maximum axial width of the inner cavity of the tire, comprising in an unmounted state a meridian section defined by a radially inner generatrix of radius $R_A$ equal to the radius $R_J$ of the rim base of the service rim and of axial width $L_{AO}$ of between 0.8 and 1 times the axial distance $L_{BO}$ between the axially inner ends of the toes of the beads of the tire to be mounted on the service rim, a radially outer generatrix of radius greater than the radius $R_A$ by an amount $h_c$ of between 0.05 $R_J$ and 0.40 $R_J$ and two lateral sides of identical profile, the transverse clamping $L_A$–$L_B$ of the ring on the inner walls of the beads being negative or zero at the level of the inner generatrix, increasing slightly over a radial distance $h_1$ at least equal to 0.05 $R_J$, said slight increase being uniform, continuous and substantially linear and then increasing more greatly over a radial distance $h_2$ at most equal to 0.4 $R_J$, said increase being uniform, continuous and substantially linear, then becoming at most constant over the radial distance $h_3$ at least equal to 0.02 $R_J$, the sum of the distances $h_1$, $h_2$ and $h_3$ being equal to the height $h_B$ of the lateral sides of the ring, the difference $h_B$–$h_C$ being at most equal to 0.05 $R_J$ and the distances $L_A$ and $L_B$ being the axial width of the ring and the axial distance between the beads, respectively, measured across a generatrix G located at a variable radial distance h from the generatrix of the meridian section of radius $R_A$.

2. A sealing ring according to claim 1, in which the increase in the clamping over the radial distance $h_1$ is uniform, continuous and substantially linear until reaching, at the level of the height $h_1$, a maximum positive clamping at most equal to $0.30 L_A$.

3. A sealing ring according to claim 2, in which the increase of the clamping over the radial distance $h_2$ is such as to reach a maximum positive clamping at least equal to $0.15 L_A$ at the level of the height $h_1+h_2$.

4. A sealing ring according to claim 3, in which the clamping over the radial distance $h_3$ is positive and constant.

5. A sealing ring according to claim 1, in which the radial distance $h_3$ is between $0.05 R_J$ and $0.20 R_J$.

6. A sealing ring according to claim 5, in which the radial distance $h_2$ is between 0 and $0.1 R_J$.

7. A sealing ring according to claim 6, in which the radial distance h3 is between $0.02 R_J$ and $0.1 R_J$.

8. A sealing ring according to claim 1, in which it is formed of a vulcanized rubber stock of Shore A hardness not greater than 65.

9. An assembly comprising a tubeless tire with beads, the tire having an inner form ratio H/S at most equal to 0.8, H being the height of the inner cavity of the tire and S being the maximum axial width of the inner cavity of the tire; the tire's service rim having a fiat rim base; and a sealing ring, wherein the tire is mounted on the rim and the sealing ting is mounted on the fiat rim base between the beads of the tire, the sealing ring in an unmounted state comprising a meridian section defined by:

a radially inner generatrix of radius $R_A$ equal to the radius $R_J$ of the rim base of the service rim and of axial width $L_{AO}$ of between 0.8 and 1 times the axial distance $L_{BO}$ between the axially inner ends of the toes of the beads of the tire to be mounted on the service rim, a radially outer generatrix of radius greater than the radius $R_A$ by an amount $h_C$ of between $0.05 R_J$ and $0.40 R_J$, and two lateral sides of identical profile, the transverse clamping $L_A - L_B$, of the ring on the inner walls of the beads being negative or zero at the level of the inner generatrix, increasing slightly over a radial distance $h_1$ at least equal to $0.05 R_J$, said slight increase being uniform, continuous and substantially linear, and then increasing more greatly over a radial distance $h_2$ at most equal to $0.4 R_J$, said increase being uniform, continuous and Substantially linear, then becoming at most constant over the radial distance $h_3$ at least equal to $0.02 R_J$, the sum of the distances $h_1$, $h_2$ and $h_3$ being equal to the height $h_B$ of the lateral sides of the ring, the difference $h_B - h_c$ being at most equal to $0.05 R_J$ and the distances $L_A$ and $L_B$ being the axial width of the ring and the axial distance between the beads, respectively, measured across a generatrix G located at a variable radial distance h from the generatrix of the meridian section of radius $R_A$.

* * * * *

UNITED STATES PATENT AND TRADEMARK OFFICE
CERTIFICATE OF CORRECTION

PATENT NO. : 5,495,881
DATED      : Mar. 5, 1996
INVENTOR(S) : Girard

It is certified that error appears in the above-indentified patent and that said Letters Patent is hereby corrected as shown below:

Col. 5, line 15, "distance $h_3$" should read --distance $h_1$--;
line 19, "distance h3" should read --distance $h_3$--;
line 28, "ting" should read --ring--;
lines 27 and 29, "fiat" should read --flat--.

Signed and Sealed this

Seventeenth Day of September, 1996

*Attest:*

BRUCE LEHMAN

*Attesting Officer*   Commissioner of Patents and Trademarks